Dec. 2, 1947.  J. F. McCANN  2,431,702
CHAIN BUSHING AND SIDE PLATE CONSTRUCTION
Filed Nov. 26, 1945
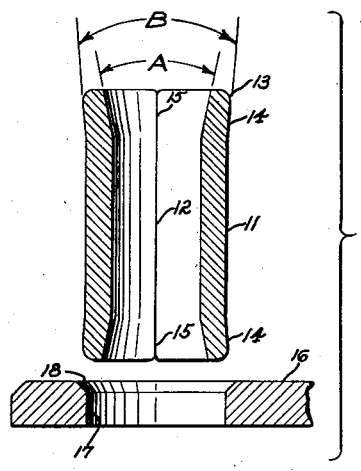
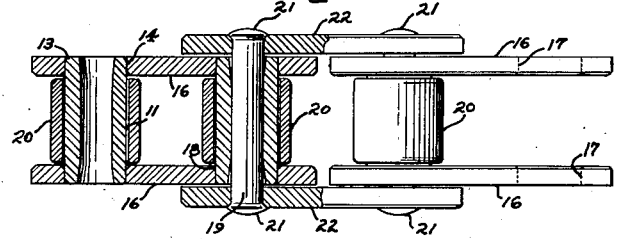
JOHN F. McCANN
INVENTOR.
BY *George A. Evans*
ATTORNEY Patented Dec. 2, 1947

2,431,702

UNITED STATES PATENT OFFICE 2,431,702

CHAIN BUSHING AND SIDE PLATE CONSTRUCTION

John F. McCann, Longmeadow, Mass., assignor to Chain Belt Company, Milwaukee, Wis., a corporation of Wisconsin Application November 26, 1945, Serial No. 630,894

5 Claims. (Cl. 74—255)

This invention relates to the construction of chain bushings and side plates which are assembled in a chain link to provide a bearing for the pin connecting the side plates of an adjacent link.

In my co-pending application, Serial No. 541,329, filed June 21, 1944, entitled Chain construction, there is disclosed a method of flaring the ends of a chain bushing such that when these ends are press-fitted into the side plates of its associated link, improved grip is obtained to resist the tendency of the links to loosen and move sidewise of the bushing. The construction disclosed in said application also provides a space between the bushing and the pin at each end of the bushing which avoids concentration of wear on the bushings at these locations and facilitates lubrication of the pintle joint.

In the smaller sizes of roller chain, the customary practice is to curl the bushing from flat stock until a cylindrical shape is obtained with the seam disposed longitudinally. The ends are then press-fitted into apertures in the side plates, the press fit alone being relied upon to prevent loosening of the parts. In larger chains, the bushings are made from solid stock bored and reamed, but the press-fit technique is substantially the same.

It is an object of the present invention to provide a chain in which the bushing is gripped by the side plates in an improved manner and excessive strains are avoided.

A further object of the invention is to provide a flared bushing construction in which relief sections are provided between the pin and the ends of the bushing after assembly, thereby increasing the bearing area in the joint, and in which due to the contour of the flared portion, the seam running longitudinally of the bushing is maintained in closed condition after the flaring operation.

Another object is to provide an interlock between the ends of the bushing and the side plates which has greater resistance to fatigue when the chain is in service.

Another object is to provide an economical and consistently reliable method of providing an improved lock between the bushing and the side plates.

When a chain is placed in tension, each pin being secured at its two extremities acts as a beam and tends to bend or bow outwardly. If the internal diameter of the bushing through which the pin extends is constant or substantially uniform throughout its length, this tendency of the pin to deflect results in the maximum pressure being exerted on those portions of the pin which contact the ends of the bushing, and since the pin turns in the bushing as the chain flexes, this portion is the area of greatest wear.

According to the present invention, the ends of the bushing are flared outwardly prior to its insertion in the side plate holes, but the amount of the flare on the inside of the bushing is slightly greater than that of the outside whereby the inside ends of the bushing after assembly in the side plates may still be slightly greater in diameter than the rest of the bushing due to the initial flare on the inside, while the outside flare is just sufficient to provide increased grip at the ends of the bushing and avoid the formation of a shoulder on the bushing in the region where the inside edges of the side plate engage the bushing. If the flare on the outside ends of the bushing were as great as the flare on the inside of the end portions, the latter having been designed as aforesaid, the bushing may be subject to excessive strain when forced into a side plate hole having the desired interference for an adequate press-fit.

A full and complete explanation of how the objects of the present invention are obtained will appear from the following description and by reference to the accompanying drawings, wherein:

Fig. 1 is a section of the bushing and a portion of a side plate prior to their assembly in the chain; and Fig. 2 is a view, partly in section, of a plurality of assembled links embodying the invention.

The drawings are not made to scale and certain shapes are greatly exaggerated in order to bring out dimensions which if drawn to scale would probably be imperceptible without magnification.

Fig. 1 illustrates the bushing, generally designated 11, prior to its assembly in the link. As shown herein, the bushing may have been curled into tubular shape and if so, will have a longitudinal butt seam 12. The strip from which the curled bushings are formed ordinarily has round edges which accounts for the round edges 13 of the ends of the bushing.

The ends 14 of the bushing are flared outwardly and are also slightly tapered so that the inside included angle of the inside portion of end (designated A in the drawings) is greater than the outside included angle (designated B in the drawings). The flared portion may be formed as disclosed in my co-pending application, previously identified; i. e., a tubular bushing may be held in a suitable die having the die shape of the desired external contour and punches may be inserted from the opposite ends to flare the bushing into the tapered recesses in the ends of the die members. The taper on the punch has a slightly greater angle than the taper in the die, resulting in the differences in the angle of the outside and inside of the flared end portions, as previously described.

The provision of a taper on the flared ends of the bushing maintains that portion 15 of the seam 12 in the region of the flared ends in uniformly closed contact similar to the remainder of the seam. This is important as it insures substantial roundness of the outside ends of the flared portions and permits them to be led into the side plate hole without danger of their cutting the edges of the hole.

The side plate 16 is provided with an aperture 17 arranged to receive the flared end of the bushing 11. The diameter of the aperture 17 is slightly less than the outer diameter of the ends of the bushing whereby a press-fit is obtained when the bushing is inserted in the hole.

The hole 17 may be formed by an ordinary punching operation which usually results in a breakout of the metal, the extent of which will vary with the wear which occurs on the punch, and it is generally desirable to straighten the punched hole in order to maintain uniformity between successive operations. The hole may be straightened by a broaching or swaging operation performed after punching or simultaneously therewith. If the metal surrounding the hole is expanded beyond its yield point during this straightening operation, the inside fibers will be placed in compression and the resistance of the metal surrounding the bushing to fatigue strains imposed on the chain when in service will be greatly increased.

It is also desirable to chamfer or bevel the portion 18 surrounding the inner edge of the hole in order that the flared portion 14 of the bushing may be led into the aperture during the press fitting operation.

When the bushings and side plates have been formed they are assembled as indicated in Fig. 2 of the drawings, care being exercised to orient the seam 12 so it will not be on the side which will be contacted by the connecting pin 19 of the adjoining link. In roller chain, a roller 20 is slipped over each of the bushings before the side plates are assembled and the side plates then enclose the rollers and make a unitary bushing link.

The pin links are formed of side plates 22 connected by pins 19 which may be headed over as at 21 to prevent their becoming disassembled. Alternate bushing links are connected by pin links with each bushing serving as a journal for the pin which extends through it.

An example of the actual dimensions of the parts will illustrate how the invention may be applied. With a standard No. 50 roller chain, which is a ⅝ inch pitch chain complying with the standards of American Society of Mechanical Engineers, Society of Automotive Engineers and the American Gear Manufacturers' Association, the distance between the side plates of the bushing link is approximately ⅜ inch and the thickness of the side plates is of the order of .08 inch.

In carrying out the present invention the flared portion 14 is of a length approximately equal to the thickness of the side plate. The included angle A is of the order of 4° and that of the angle B is of the order of 2°.

With this chain the diameter of the finished hole 17 is held to a tolerance of .282–.283 inch, and the outside diameter of the bushing prior to flaring is of the order of .285 inch. After flaring, the O. D. of the end of the flared portion will be from .287–.288 inch. The press fit is preferably about .005 inch and may vary from about .004 to about .006 inch for this size chain.

In this particular chain, the 4° included angle at the inside of the flared end insures that after the press fit the inside diameter of the end portions will still be greater than the inside diameter of the main body portion of the bushing, and when the pin 19 is placed under load the bearing stress is distributed across the length of the bushing resulting in less pitch elongation after prolonged service.

When the side plate is forced over the bushing, the grip on the bushing is extended for the full width of the side plate due to the initial flare on the outside of the bushing. The 2° included angle is sufficient to maintain this grip with the press fit interference of the magnitude specified and there will be no collapse of the ends of the bushing such as customarily occurs with straight bushings and no resulting round shoulders where the inside edges of the smaller side plate hole engage the bushing. The pressure of shoulders is a factor in causing lateral displacement of the bushing side plates and locking of adjacent chain links.

The invention having been described, what is claimed is:

1. A bushing for chain links and the like comprising a cylindrical tubular body adapted to receive a pin of an adjacent link in pivotal bearing engagement therewith, the ends of said body being flared outwardly and of tapered thickness to provide a greater angle of flare on the inside than on the outside, the inside flare being sufficient to provide a substantial relief between the pin and bushing at the ends of the latter, and the outside flare being sufficient to provide a substantial press fit interference with a side plate without the formation of a shoulder on the bushing tending to displace the side plate in service.

2. A bushing for chain links and the like comprising a curled cylindrical tubular body with a longitudinal butt seam therein and adapted to receive a pin of an adjacent link in pivotal bearing engagement therewith, the ends of said body being flared outwardly and of tapered thickness to provide a greater angle of flare on the inside than on the outside, the inside flare being sufficient to provide a substantial relief between the pin and bushing at the ends of the latter, and the outside flare being sufficient to provide a substantial press fit interference with a side plate without the formation of a shoulder on the bushing tending to displace the side plate in service and without substantial deformation of the butt seam of the bushing.

3. A chain link comprising a pair of apertured side plates, and a bushing having said side plates press fitted onto the opposite ends thereof and having a cylindrical tubular body adapted to receive a pin of an adjacent link in pivotal bearing engagement therewith, the ends of said body being of tapered thickness to provide an outward flare on the inside sufficient to provide a substantial relief between the pin and bushing at the ends of the latter, and the outside surface of the bushing at the respective ends being dimensioned relative to the corresponding side plate aperture to provide a substantial press fit interference between the bushing and side plate without the formation of a shoulder on the bushing tending to displace the side plate in service.

4. A chain link comprising a pair of apertured side plates, and a bushing having said side plates press fitted onto the opposite ends thereof and having a curled cylindrical tubular body with a longitudinal butt seam therein and adapted to receive a pin of an adjacent link in pivotal bearing engagement therewith, the ends of said body being of tapered thickness to provide an outward flare on the inside sufficient to provide a substantial relief between the pin and bushing at the ends of the latter, and the outside surface of the bushing at the respective ends being dimensioned relative to the corresponding side plate aperture to provide a substantial press fit interference between the bushing and the side plate without the formation of a shoulder on the bushing tending to displace the side plate in service and without substantial deformation of the butt seam of the bushing.

5. A chain link comprising a pair of side plates, and a bushing having said side plates press fitted onto the opposite ends thereof and having a cylindrical tubular body adapted to receive a pin of an adjacent link in pivotal bearing engagement therewith, the ends of said body being flared outwardly and of tapered thickness to provide a greater angle of flare on the inside than on the outside, the inside flare being sufficient to provide a substantial relief between the pin and bushing at the ends of the latter, the outside flare being sufficient to provide a substantial press fit interference with the corresponding side plate effecting a gripping of the bushing by the side plate throughout substantially the entire thickness of the latter without the formation of a shoulder on the bushing tending to displace the side plate in service.

JOHN F. McCANN.